United States Patent [19]

Ahmed

[11] Patent Number: 5,143,970
[45] Date of Patent: Sep. 1, 1992

[54] PROCESS FOR MAKING NITROCELLULOSE-ACRYLIC LATICES

[75] Inventor: Syed M. Ahmed, Hockessin, Del.

[73] Assignee: Aqualon Company, Wilmington, Del.

[21] Appl. No.: 709,659

[22] Filed: Jun. 3, 1991

Related U.S. Application Data

[62] Division of Ser. No. 637,794, Jan. 8, 1991.

[51] Int. Cl.$^5$ ................................. C08K 5/49
[52] U.S. Cl. ..................... 524/710; 524/32; 524/716
[58] Field of Search ............. 524/32, 710, 716

[56] References Cited

U.S. PATENT DOCUMENTS

| | | | |
|---|---|---|---|
| 3,522,070 | 7/1970 | Webb, Jr. | 524/32 X |
| 3,953,386 | 4/1976 | Murphy et al. | 260/17 |
| 4,011,388 | 4/1977 | Murphy et al. | 526/320 |
| 4,177,177 | 12/1979 | Vanderhoff et al. | 260/29.2 |

OTHER PUBLICATIONS

P. Z. Becher, Encyclopedia of Emulsion Technology, vol. 2, p. 281.

*Primary Examiner*—Joseph L. Schofer
*Assistant Examiner*—J. M. Reddick
*Attorney, Agent, or Firm*—James K. Luchs

[57] ABSTRACT

Water wet nitrocellulose, butyl acrylate/methyl methacrylate monomers and phosphate surfactant are emulsified into an oil-in-water emulsion and polymerized to produce a nitrocellulose/acrylic latex emulsion with a particle size below 0.25 microns. Wood finishing lacquers produced from this latex emulsion are equivalent in performance to solvent lacquers while lowering VOC to below 2.3 lb/gal.

4 Claims, No Drawings

PROCESS FOR MAKING NITROCELLULOSE-ACRYLIC LATICES

This application is a division of application Ser. No. 07,637,794, filed Jan. 8, 1991.

FIELD OF THE INVENTION

The invention relates to nitrocellulose compositions applied to wood surfaces as a lacquer. In particular the invention relates to an improved waterborne nitrocellulose/acrylate emulsion.

BACKGROUND OF THE INVENTION

Waterborne nitrocellulose/acrylic lacquer emulsions were previously known from U.S. Pat. No. 3,953,386 and 4,011,388. While these emulsions were fully functional, they failed to gain acceptance in the furniture finishing trade, where solvent based lacquers continue to be used almost uniformly.

Vanderhoff et al., U.S. Pat. No. 4,177,177, outlines three emulsification methods for making latices such as a waterborne nitrocellulose/acrylic emulsion. These are sometimes referred to as "artificial latices".

(1) Emulsification of the Polymer Solution. In this method the polymer is dissolved in a volatile solvent or a mixture of solvents which are immiscible with water. The polymer solution is then dispersed, usually by some kind of mechanical means, in water in the presence of surfactants. The volatile solvent is then removed by vacuum distillation followed by concentrating the resulting dilute latex to the desired solids. This method is reported to give latices with particles of about 1 micron in diameter.

(2) Emulsification by Phase Inversion. In this method the polymer which is being emulsified is mixed with surfactant and a volatile solvent or a mixture of solvents for the polymer. Then water is added to this solution. In the early stages of water addition, a water-in-oil emulsion is formed which upon further addition of water inverts to an oil-in-water emulsion. According to the Vanderhoff et al. patent, this method calls for greater care and control than method (1) and in addition yields latex particle diameter of about 0.8-1.0 micron or larger.

(3) Self emulsification. This method requires polymer molecules to be chemically modified by incorporation of functional groups in such a way that the polymer becomes self emulsifiable in aqueous media. This method is reported to Yield very small size (0.1 u) particles. The main disadvantage of this method is reported to be the water-sensitivity of the film due to significant proportions of the functional groups of the polymer backbone.

Spontaneous emulsification is also described in the literature as another method of making artificial latices. This method, similar to the self emulsification method described above, however, does not require the chemical modification of the polymer molecules.

Spontaneous emulsification is reported to be the result of interfacial turbulence, diffusion of one of the components from one phase to the other, and by negative interfacial tension between two phases from P. Z. Becher, *Encyclopedia of Emulsion Technology* Vol. 2, p. 281.

The Vanderhoff et al. patent concludes that the first method is a preferred way of making artificial latices. Particle size is the only disadvantage they see in the process. This patent teaches the method to reduce the particle size to the desired range by using mixed emulsifiers (emulsifier + long chain alkane or long chain alcohols). Using this technology, they reported to make latices with particle diameters of <0.5 micron.

Thus, it remained for the present invention to provide a sufficient degree of improvement in waterborne nitrocellulose/acrylic emulsions that advantages would outweigh disadvantages in order to induce a switch from tried and true techniques of solvent application.

SUMMARY OF THE INVENTION

It is an object of the invention to provide a waterborne nitrocellulose/acrylic emulsion which is solvent free or substantially solvent free as made and has a nitrocellulose content of up to 65% by weight based on the total weight of nitrocellulose and acrylic polymer and wherein the emulsion has a particle size below 0.25 microns.

A process of emulsification for preparing a nitrocellulose/acrylic emulsion involves the steps:

(1) mixing nitrocellulose with at least one monomer and at least one anionic surfactant to produce a mixture;

(2) emulsifying the mixture by the addition of water to form an oil-in-water emulsion;

(3) adding initiator to the oil-in-water emulsion and polymerizing at a temperature of from 20° C. to 90° C. to produce a nitrocellulose/acrylic latex emulsion with a particle size below 0.25 microns; and (4) filtering.

DETAILED DESCRIPTION OF THE INVENTION

Environmental Protection Agency (EPA) regulations for emission of organic solvents are becoming increasingly stringent. It is anticipated that by 1994 a Volatile Organic Compound (VOC) content of less than 2.3 lbs. per gallon will be required for nitrocellulose lacquers used in California. A practical VOC limit in metric terms is less than 200 g/l (gram/liter).

Methods of meeting such stringent VOC limits have involved prior art manufacture of a waterborne nitrocellulose/acrylic emulsion. These failed to reduce VOC significantly. Therefore, a need existed prior to the present invention for a simpler process.

Not only has a simpler process been discovered, but further it has been discovered that an improved product having superior properties is produced when the new process is employed.

Aqualon, a Hercules Incorporated Company, supplies a water wet nitrocellulose with a nitrogen content of from 10.9 to 12.2% which is suitable for the practice of the present invention. Other supplies of similar nitrocellulose are Wolff Walsrode, ICI and Asahi.

A preferred surfactant (phosphate esters of ethoxylated nonylphenol and $C_{10}$ to $C_{15}$ aliphatic hydrocarbon) required for the practice of the invention is available from Rhone Poulenc as GAFAC® RE610 and RS 710 with the structures:

Monoester

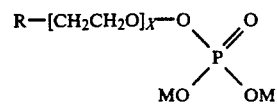

Diester

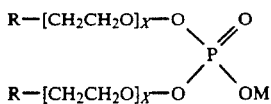

where M = H or Na

R = GAFAC ® RE610 C₉H₁₉—O— 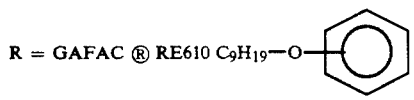

GAFAC ® RS710 C₁₃H₂₇—O

X = 10–15

It is essential for the process that these surfactants be at least partially neutralized with caustic such as sodium hydroxide (NaOH). It is also essential that a surfactant or surfactant mixture having properties similar to GAFAC® RE610 and RS710 be employed in the process of the invention. A nonionic surfactant may be employed with a suitable anionic surfactant. It is important that the surfactant be soluble in both the organic phase and the aqueous phase.

Not only are surfactant to nitrocellulose ratios important, but also water to nitrocellulose ratios. Suitable weight basis ratios for surfactant to nitrocellulose are from 5–15 parts surfactant to 100 parts nitrocellulose. The weight ratio for water to nitrocellulose for the water wet nitrocellulose ranges from 10 to 40% water to 90 to 60% nitrocellulose.

However, 15 to 35% by weight water is preferred for the water wet nitrocellulose. Too much water or too little water increases latex particle size.

A monomer mixture of butyl acrylate and methyl methacrylate is preferred for the practice, but other monomers and monomer mixtures can be employed. Suitable monomers include butyl acrylate, ethyl acrylate, methyl methacrylate, acrylonitrile and ethylhexyl acrylate. Acrylic acid, methacrylic acid and other monomers containing functional groups can be used in combination with other monomers to obtain desired properties in the latex emulsion.

Suitable initiators for the polymerization include persulfates, peroxides, hydroperoxides, azos and other free radical initiators. For low temperature polymerization redox initiators are more suitable. A preferred low temperature initiator system is tert-butylhydroperoxide and sodium bisulfite. A preferred high temperature initiator is potassium persulfate ($K_2S_2O_8$)

Graphs based on experimental data shown the importance of using enough surfactant and avoiding too low or too high water ratios in order to achieve small particle size. Mean particle size of the latex was plotted against the % water which enters as part of the water wet nitrocellulose or other additional water adds prior to emulsification. Two series of experimental runs made with constant surfactant to nitrocellulose ratios of 0.10 and 0.15 showed that smaller particle size was obtained when the % water was from about 10 to 35% by weight. A preferred range was determined to be from 20 to 30%.

In detail the preferred process of the invention involves the steps:

(1) mixing 25 to 75 parts nitrocellulose (20 to 30% water wet) with 35 to 70 parts monomer and 2 to 10 parts of a mixed monoester and diester phosphoric acid surfactant to produce a nitrocellulose/monomer/surfactant mixture;

(2) emulsifying the mixture by addition of 40 to 60 parts by weight water based on the total parts of the nitrocellulose/monomer/surfactant in the mixture to form an oil-in-water emulsion;

(3) adding 0.1 to 1.5 weight % polymerization initiator based on the weight of monomer to the oil-in-water emulsion and polymerizing at a temperature of from 40° C. to 80° C. to produce a nitrocellulose/acrylic latex emulsion with a particle size below 0.20 microns; and (4) filtering through a 50 micron filter bag to finish the latex emulsion.

In the following examples, all parts and percentages are by weight unless otherwise indicated.

The invention has industrial applicability for wood finishing. The following examples illustrate both the product and process without being limiting.

EXAMPLE 1

Preferred Nitrocellulose/Acrylic Emulsion Process

A 274 g portion of emulsion grade water wet nitrocellulose ½ sec (available from Aqualon) comprising 200 g nitrocellulose and 74 g water was added to a jacketed glass reactor equipped with thermometer, air stirrer and nitrogen sparging tube. A separate liquid mixture was prepared by mixing 100 g butyl acrylate, 100 g methyl methacrylate (both polymerization grade from Rhom & Haas), 30 g GAFAC® RS 710 (Rhone Poulenc) and 7.5 g of 25% aqueous sodium hydroxide. The liquid was added to the stirred nitrocellulose.

Mixing was continued for an additional 60 minutes to dissolve the nitrocellulose. Then 238.5 g water was added slowly over a 15 minute period. As a result, the initial mixture was converted to an oil-in-water emulsion. This emulsion was thoroughly sparged with nitrogen. Then separate but simultaneous additions of polymerization initiator were made to the stirred emulsion of 25 g sodium bisulfite (4% aqueous solution) and 25 g tert-butyl hydroperoxide (4% aqueous solution) at the rate of 0.4 ml/minute at 30° to 40° C. After the polymerization exotherm (80° to 90° C.), the reaction mixture was maintained at 70° C. during the remaining addition of the initiator and for an additional 60 minutes. A monomer content of less than 0.5% indicated a complete reaction.

The product was cooled to room temperature and filtered through a 50 micron filter bag.

A comparison waterborne nitrocellulose/acrylic emulsion was prepared according to prior art patents U.S. Pat. No. 3,953,386 and 4,011,388. Table 1 contains comparative data of the properties of latices made by the prior art and the invention.

TABLE 1

| Latex Emulsion | Mean Particle Size | Viscosity mPas | VOC g/l | VOC lb/gal. |
|---|---|---|---|---|
| Prior Art | 0.2–0.25 | 200 | 240 | 2 |
| Invention | 0.15 | 50 | 0 | 0 |

As shown in Table 1, the advantages provided by the process of the invention are smaller particle size, lower viscosity and no Volatile Organic Compound (VOC).

EXAMPLE 2

Preferred Nitrocellulose/Acrylic Emulsion Lacquer Product

Furniture lacquers were prepared using the emulsion of Example 1 in the following formulations:

|  | Parts by Weight | |
| --- | --- | --- |
|  | Formulation #1 | Formulation #2 |
| Example 1 Emulsion | 100.0 | 100.0 |
| KP - 140 Plasticizer (FMC Corp.) | 12.5 | — |
| Santicizer ® 160 Plasticizer (Monsanto) | — | 12.5 |
| Butyl Cellosolve Acetate - Coalescing Aid (Union Carbide) | 20.0 | 20.0 |
| Deionized Water | 25.0 | 25.0 |
| Aqueous Dow Corning 57 Silicone Slip Agent (as 10% aqueous dispersion) | 1.0 | 1.0 |
| Foamex ® 805, Defoamer (Tego Chemie Service) | 2.4 | 2.4 |
| Total | 160.9 | 160.9 |

The waterborne lacquers of the invention were then compared with a conventional nitrocellulose solvent lacquer. Performance as a wood finish lacquer was comparable, but VOC was lowered from 750 g/1 to 250 g/1 (VOC lowered from 6.2 to 2.3 lb/gal).

EXAMPLE 3

Example 1 was repeated except that a waterborne nitrocellulose/acrylic latex emulsion was produced using only methyl methacrylate as the monomer. A harder latex emulsion was obtained in comparison to Example 1.

EXAMPLE 4

Example 1 was repeated except that the monomer used was a mixture of butyl acrylate, methyl methacrylate and ethylhexyl acrylate. A terpolymer latex was obtained with comparable properties to Example 1.

EXAMPLE 5

Example 1 was repeated varying nitrocellulose to monomer ratios from 25/75 to 65/35. Resulting particle sizes of the latex emulsions ranged from 0.13 to 0.16 microns.

EXAMPLE 6

Example 1 was repeated except that up to 7% of the total monomer was methacrylic acid. Particle sizes ranged from 0.19 to 0.27 microns. The resulting emulsion had a viscosity of 110 mPas at pH 4 and a viscosity of 1600 mPas at pH 8.

EXAMPLE 7

Example 1 was repeated except that potassium persulfate ($K_2S_2O_8$) was used as the initiator. Particle size ranged from 0.14 to 0.16 microns.

EXAMPLE 8

Example 1 was repeated except that the water wet nitrocellulose varied from 18-25 cps to 5 to 6 second viscosity grade. Particle size varied from 0.13 to 0.15 microns. This example illustrates the broad range of nitrocellulose which can be employed to produce fully satisfactory waterborne nitrocellulose/acrylic emulsion.

EXAMPLE 9

Example 1 was repeated except that the quantities of material used and the size of the equipment used was increased by a factor of about 100 ×. Identical emulsion properties were obtained.

What is claimed is:

1. A process for preparing a nitrocellulose/acrylic emulsion for wood finishing lacquers with lower Volatile Organic Compound (VOC) involves the steps:
    (1) mixing water wet nitrocellulose with a nitrogen content of 10.9 to 12.2% with at least one monomer selected from the group of butyl acrylate, methylmethacrylate and ethylhexyl acrylate and at least one surfactant to produce a mixture;
    (2) emulsifying the mixture by the addition of water to form an oil-in-water emulsion; and
    (3) adding initiator to the oil-in-water emulsion and polymerizing at a temperature of from 20° to 90° C. to produce a nitrocellulose/acrylic latex emulsion with a particle size below 0.25 microns.

2. The process of claim 1 where the monomers in step (1) are butyl acrylate and methylmethacrylate.

3. The process of claim 1 where the polymerization in step (3) is initiated by addition of tert-butylhydroperoxide and sodium bisulfite.

4. The process of claim 3 where the surfactant in step (1) is a phosphate ester of ethoxylated nonylphenol and a phosphate ester of ethoxylated $C_{10}$-$C_{15}$ aliphatic hydrocarbon.

* * * * *